(12) United States Patent
Miller

(10) Patent No.: US 7,252,467 B2
(45) Date of Patent: Aug. 7, 2007

(54) SPINDLE COLLET CHUCK

(75) Inventor: Arthur William Miller, 6202 Farmersville-Germantown Pike, Germantown, OH (US) 45327

(73) Assignee: Arthur William Miller, Germantown, OH (US)

( * ) Notice: Subject to any disclaimer, the term of this patent is extended or adjusted under 35 U.S.C. 154(b) by 174 days.

(21) Appl. No.: 10/778,420

(22) Filed: Feb. 14, 2004

(65) Prior Publication Data

US 2005/0180831 A1 Aug. 18, 2005

(51) Int. Cl.
*B23C 5/26* (2006.01)
(52) U.S. Cl. .................... 409/233; 409/232; 279/51
(58) Field of Classification Search ........ 409/232–234; 279/43, 51, 58
See application file for complete search history.

(56) References Cited

U.S. PATENT DOCUMENTS

| | | | | |
|---|---|---|---|---|
| 2,361,324 A * | 10/1944 | Severson | ................. | 409/233 |
| 3,244,427 A * | 4/1966 | Taschl | ................. | 279/57 |
| 4,714,389 A * | 12/1987 | Johne | ................. | 409/233 |
| 4,801,227 A * | 1/1989 | Glimpel et al. | ................. | 409/234 |
| 5,030,047 A * | 7/1991 | Pfalzgraf | ................. | 409/234 |
| 5,265,990 A * | 11/1993 | Kuban | ................. | 409/232 |
| 5,433,562 A * | 7/1995 | Phillips et al. | ................. | 409/233 |
| 5,567,093 A * | 10/1996 | Richmond | ................. | 409/136 |
| 5,593,258 A * | 1/1997 | Matsumoto et al. | ................. | 409/234 |
| 5,964,556 A | 10/1999 | Toyomoto | | |
| 5,984,595 A * | 11/1999 | Mizoguchi | ................. | 408/57 |
| 6,077,003 A | 6/2000 | Laube | | |
| 6,974,287 B2 * | 12/2005 | Neumeier | ................. | 409/232 |

\* cited by examiner

*Primary Examiner*—Monica Carter
*Assistant Examiner*—Eric A. Gates
(74) *Attorney, Agent, or Firm*—R. William Graham; A Patent Lawyer Corp PC

(57) ABSTRACT

A collet chuck configured to connect to a standard milling machine spindle, wherein the collet chuck includes a centering sleeve having a tapered outer peripheral surface for contact with an inside peripheral tapered surface of the spindle and has an outer end disposed adjacent the mounting end of the spindle, a chuck body having a base with an outer end including mounting end to mount to the end of the spindle, and a biasing element operably disposed between the outer end of the centering sleeve and a portion of a back side of the base in a manner such that the biasing element exerts a force on the back side prior to a direct connection of the base to the mounting end thereby providing for variances in connection of the base to the mounting end of the spindle and assuring concentricity is maintained when so connected.

8 Claims, 5 Drawing Sheets

SPINDLE COLLET CHUCK

BACKGROUND OF THE INVENTION

1. Field of the Invention

The present invention relates to a spindle collet chuck, and more particularly, to a spindle collet chuck with a novel mounting self centering and quick connect aspect.

2. Description of Related Art

The known conventional collet chuck for holding rotating bits installed on spindle shaft of a machine tool includes a chuck body with a collar which is flush mounted to a mounting face of a spindle using screws. The conventional collet chuck has a problem that a gap is often left between the mounting face of the spindle shaft and the mounting face of the chuck collet due to surface variations. These variances between the components are due to tolerances. Attempts to rectify the resulting variance have been made to enable the installation in which the collet chuck and in turn, tool, is positioned with respect to the spindle shaft in a concentric manner. One such way requires that the chuck body include a plurality of indexing screws which are used to align the collet chuck body, and in turn the spindle nose in concentric relation with the spindle shaft. Other concentricity techniques use the tapered center for mounting and centering via a drawbar in the spindle, however, they do not mount to the end of the spindle. While this enables good centering, upon release of the drawbar, it releases the entire holding device as opposed to just the tool needing to be changed and thus is more costly. Existing face mounts to the end of the spindle have problems with achieving concentricity and require clearance for attachment to the spindle. A further problem resides in the need for quick interchange of tool parts.

Such prior designs have yet to meet the expectations in the field. Such prior techniques are time consuming and difficult to align and or change out tool parts. There remains a need to simplify and improve collet chuck—spindle connections to quickly enable concentricity to be achieved and quick interchangeability of tool parts. The present invention meets such prior needs.

SUMMARY OF THE INVENTION

It is an object to provide a collet chuck that solves the above-mentioned problems.

It is another object to provide a collet chuck with a self centering aspect.

It is a further object to provide for a collet chuck having a quick change of tool capability.

Accordingly, the collet chuck of the present invention is configured to connect to a standard milling machine spindle of the type that includes an inside tapered peripheral surface which terminates adjacent a mounting end of the spindle, wherein the mounting end of the spindle includes a plurality of threaded apertures. The collet chuck includes a centering sleeve having a tapered outer peripheral surface which contacts the inside peripheral tapered surface of the spindle and has an outer end disposed adjacent the mounting end of the spindle and a chuck body having base and a neck extending outward from a central region of a front face of the base.

An outer end of the base includes a first plurality of apertures extending therethrough which when the outer base end is disposed adjacent the mounting end of the spindle can be aligned with the plurality of threaded apertures of the spindle mounting end. The base further includes a second plurality of apertures extending therethrough disposed radially outward from the neck and inward from the first plurality of apertures. A working end of the neck includes an open inner tapered surface.

A spring, such an O-ring or Bellville washer(s), can preferably be operably disposed between the outer end of the centering sleeve and a portion of a back face. Preferably, an annular seat is formed in the back face which receives a portion of the outer end of the sleeve in contact therewith having the spring disposed adjacent thereto. A first plurality of screws threadably connect the base to the mounting end of the spindle. The spring serves to accommodate for variances in the connection of the base to the mounting end of the spindle and works together with the centering sleeve to assure concentricity is also maintained.

A puller sleeve is movably disposed about the neck and includes a plurality of connector legs extending from one end and configured to be slidably received through the second plurality of apertures in the base, wherein each leg includes a threaded aperture. An outer end of the puller sleeve includes a retaining collar.

A tool clamping sleeve includes an outer tapered surface complementary to the inner tapered surface of the working end of the neck and includes an inner surface configured to receive an outer surface of a tool bit. A collet cap sleeve is configured to be received about the working end of the neck and includes an end configured to quick connect to the retaining collar of the puller sleeve. An outer end of the collet cap includes a retaining collar which when the end is connected to the retaining collar of the puller sleeve contacts the tool clamping sleeve in a retaining manner.

A drawbar adapter includes a plurality of apertures which can be aligned with the threaded apertures of the legs. A second plurality of screws threadably connect the drawbar adapter to the puller sleeve legs thereby fixably connecting the base therebetween. The drawbar adapter includes a threaded aperture to receive a threaded end of a drawbar of the machine spindle.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

The present invention will be described with reference to the accompanying drawing wherein.

DETAILED DESCRIPTION OF EMBODIMENTS

Figure 1:
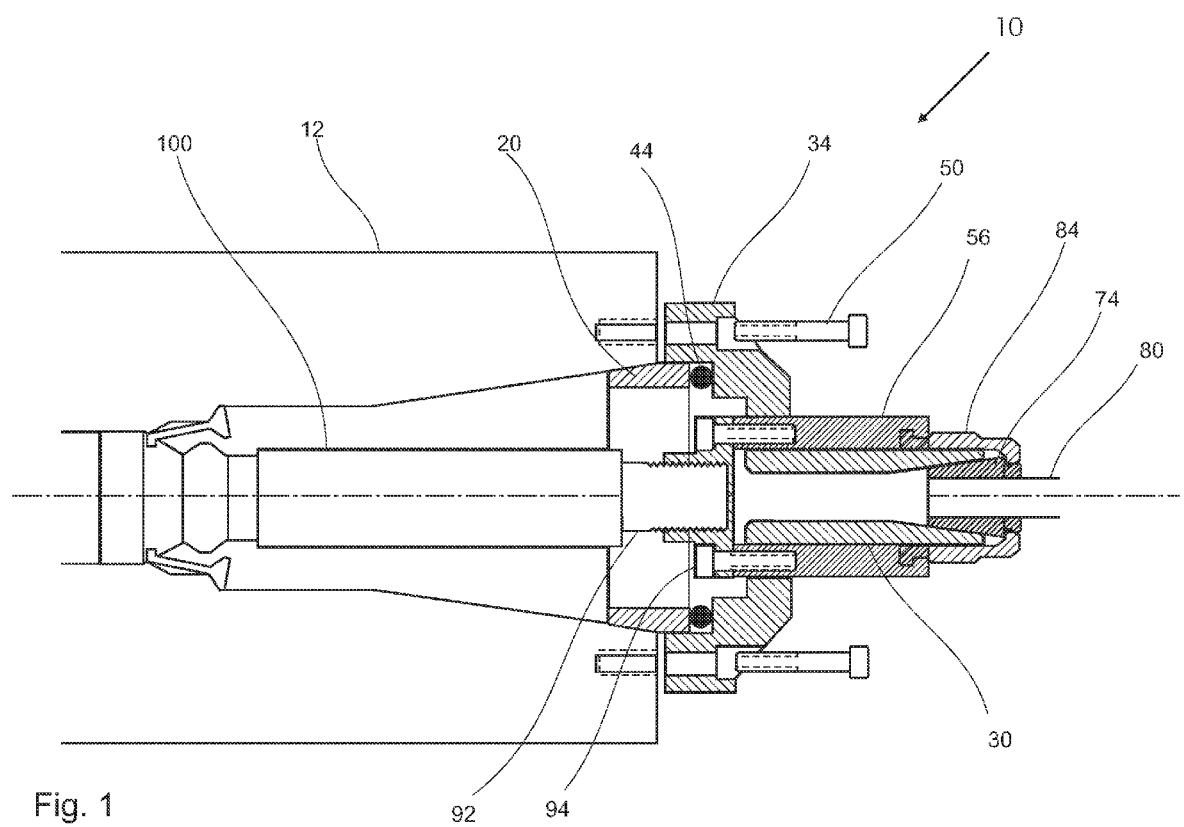
FIG. 1 is a sectional illustration showing the collet chuck disengaged by a drawbar of the machine spindle.
Figures 2, 3A, 3B:
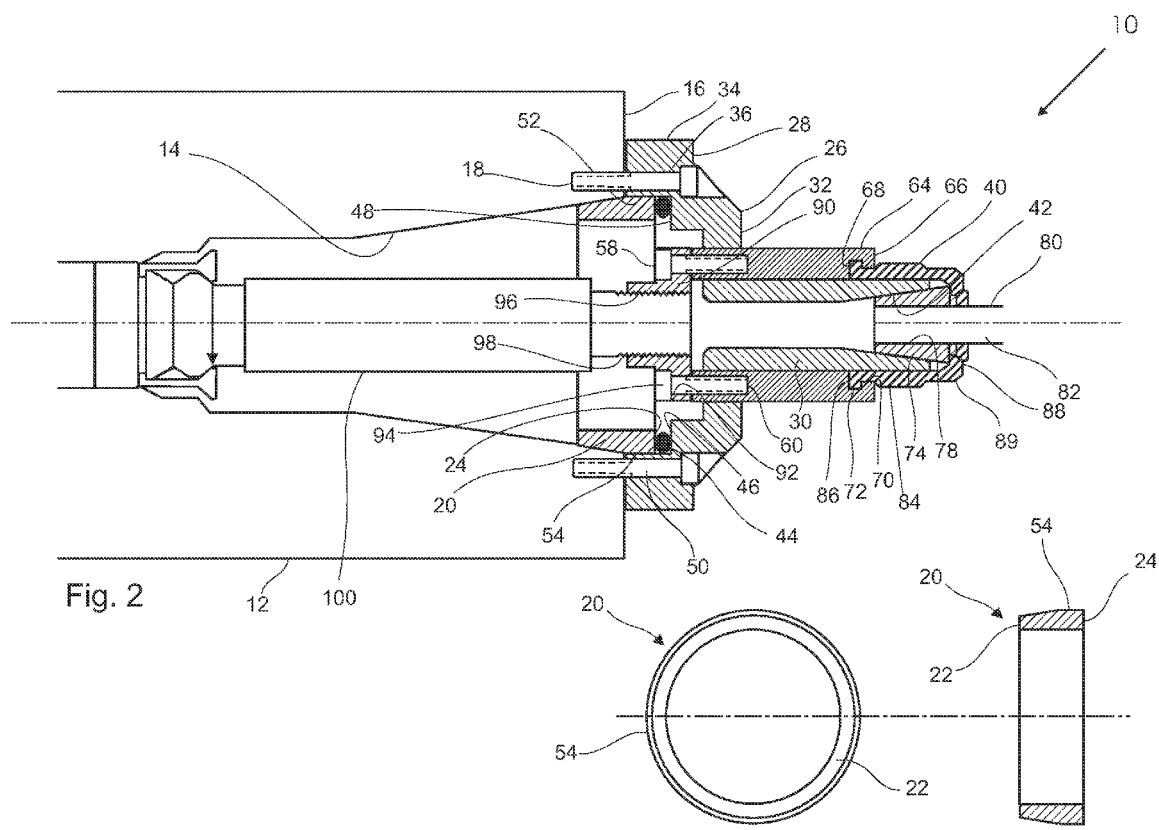
FIG. 2 is a sectional illustration showing the collet chuck engaged by a drawbar of the machine spindle.
FIG. 3A is an end view of a centering sleeve of the invention.
FIG. 3B is a cross section view of the centering sleeve of FIG. 3A.

Referring now to the drawings, the collet chuck for use with a milling machine spindle is generally referred to by the numeral 10. The collet chuck 10 of the present invention is configured to connect to a standard milling machine spindle 12 of the type that includes an inside tapered peripheral surface 14 which terminates adjacent a mounting end 16 of the spindle 12. The tapered surface 14 is of an American Standard Steep Machine Taper 3.500 inch per foot with the mounting end 16 having a surface variance plus/minus 0.015. The mounting end 16 of the spindle 12 includes a plurality of threaded apertures 18 which can be preferably spatially equidistant about the end 16 and extend axially inward.

The collet chuck 10 includes a centering sleeve member 20 having an end 22 which includes a tapered outer peripheral surface complementary to the inside peripheral tapered surface 14 and serves as part of an alignment mechanism of the collet chuck 10. The sleeve member 20 has an outer end 24 disposed adjacent the mounting end 16 and extends outward therefrom when the end 22 is in contact with the inside peripheral tapered surface 14.

The collet chuck 10 includes a chuck body 26 having base 28 and a neck 30 extending outward from a central region of a front face 32 of the base 28. An outer end 34 of the base 28 includes a plurality of apertures 36 extending axially therethrough and which are spatially positioned about the end to be complementary to apertures 18. Thus, the outer base end 34 can be disposed adjacent the mounting end 16 of the spindle 12 such that the apertures 36 and 18 can be aligned. The base further includes another plurality of apertures 38 extending axially therethrough which are disposed radially outward from the neck 30 and inward from the apertures 36. A working end 40 of the neck 30 includes an open inner tapered surface 42.

A spring 44, such an O-ring or Bellville washer(s) 44', can preferably be operably disposed between the outer end 24 of the centering sleeve 20 and a portion of a back face 46 of the base 28. Preferably, an annular seat 48 is formed in the back face 46 which receives a portion of the outer end 24 of the centering sleeve 20 in contact therewith and the spring 44 is disposed therebetween.

A plurality of screws 50 threadably connect the base 28 to the mounting end 16 of the spindle 12. As stated earlier, the end 24 of the centering sleeve 20 is received in the annular seat 48 and is done so in that the end 24 is slidably concentrically so received wherein an inner wall 52 of the annular seat 48 is formed complementary to receive an outer surface 54 of end 24. The spring 44 serves to accommodate for surface variances in the connection of the base 28 to the mounting end 16 and provides for a secure connection therebetween while assuring that the centering sleeve 20 maintains concentricity of the chuck body 26.

A puller sleeve 56 is movably disposed about the neck 30 and includes a plurality of connector legs 58 extending from one end 60 and configured to be slidably received through apertures 38 in the base 28. In forming the legs 58, a milling process forms a recessed area 61 about each leg 58 to provide that the end 60 is able to properly contact the face 32 of the base 28 and avoid the radius formed at the base of each leg 58 during the milling process. Each leg 58 includes a threaded aperture 62. An outer end 64 of the puller sleeve 56 includes a retaining collar 66 which has a recessed groove 68 axially inward from a plurality of terminally disposed radially inwardly extending retention lips 70 leaving gaps 71 therebetween. The retention lips 70 can preferably be equidistantly spaced from one another. Additionally, a detent mechanism 72 is operably formed in the groove 68 and also includes a stop pin 73.

A tool clamping sleeve 74 includes an outer tapered surface 76 complementary to be received against the inner tapered surface 42 of the working end 40. The clamping sleeve 74 includes an inner surface 78 configured to receive an outer surface 80 of a tool bit 82.

A collet cap sleeve 84 is configured to be received about the working end 40 of the neck 30. The collet cap sleeve 84 includes a plurality of radially outwardly extending lips 86 end configured to be passed through the gaps 71 between the retention lips 70, forcibly passed by detent mechanism 72 and seated beneath retention lips 70 against stop pin 73. An outer end 89 of the collet cap sleeve 84 includes a retaining collar 88 which, when the lips 86 are connected to the retaining collar 66 of the puller sleeve 56 contact the tool clamping sleeve 74 in a retaining manner. This provides for a "quick connect" of the tool clamping sleeve 74 and tool bit 82 to the retaining collar 66 of the puller sleeve 56.

A drawbar adapter 90 includes a plurality of apertures 92 are spatially positioned in a manner to be aligned with the threaded apertures 62 of the legs 58. Another set of screws 94 threadably connect the drawbar adapter 90 to the puller sleeve legs 58 thereby fixably connecting the base 28 therebetween. The drawbar adapter 90 includes a central threaded aperture 96 to receive a threaded end 98 of a drawbar 100 of the machine spindle 12. Further, the drawbar adapter includes a recessed area 91 to receive a part of the leg 58 and assure that the parts remain concentric with respect to one another.

Figure 4A:
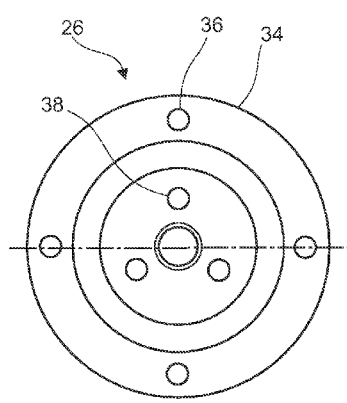
FIG. 4A is a back end view of a chuck body of the invention.
Figure 4B:
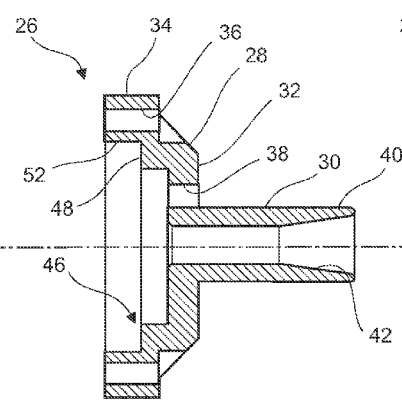
FIG. 4B is a cross section view of the chuck body of FIG. 4A.
Figure 4C:
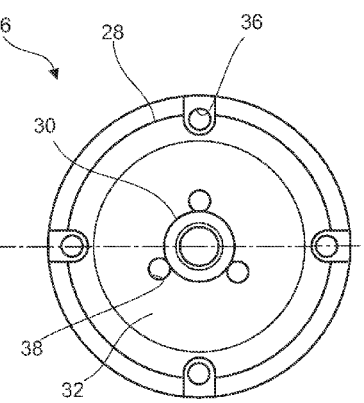
FIG. 4C is a front end view of the chuck body of FIG. 4A.
Figure 5B:
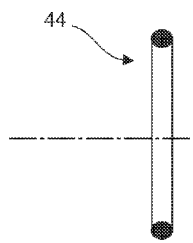
FIG. 5B is a cross section view of the spring of FIG. 5A.
Figure 5A:
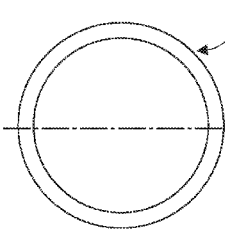
FIG. 5A is an end view of a spring of the invention.
Figure 5C:
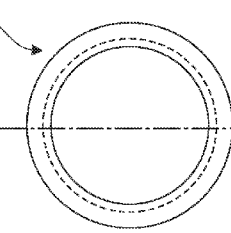
FIG. 5C is an end view of another spring of the invention.
Figure 5D:
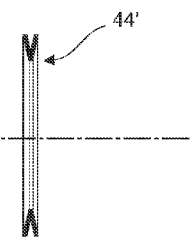
FIG. 5D is a cross section view of the spring of FIG. 5C.
Figures 6A, 6B, 6C:
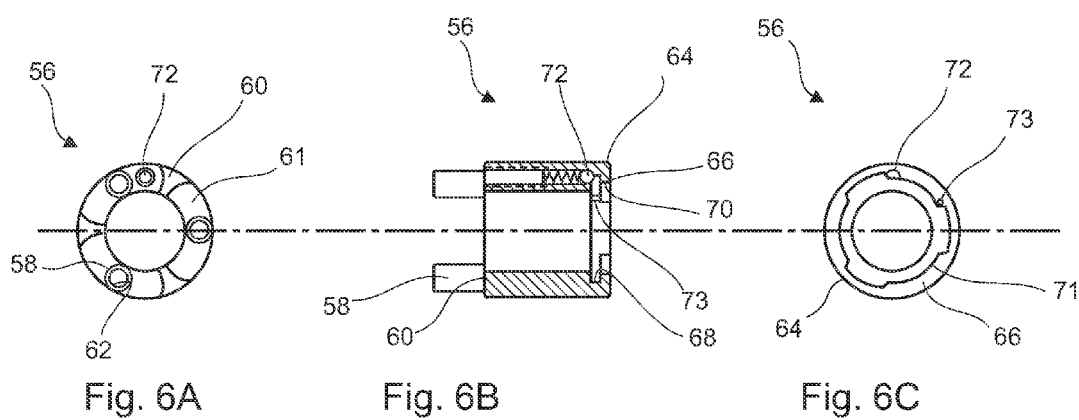
FIG. 6A is a back end view of a puller sleeve of the invention.
FIG. 6B is a cross section view of the puller sleeve of FIG. 6A.
FIG. 6C is a front end view of a puller sleeve of FIG. 6A.
Figures 7A, 7B:
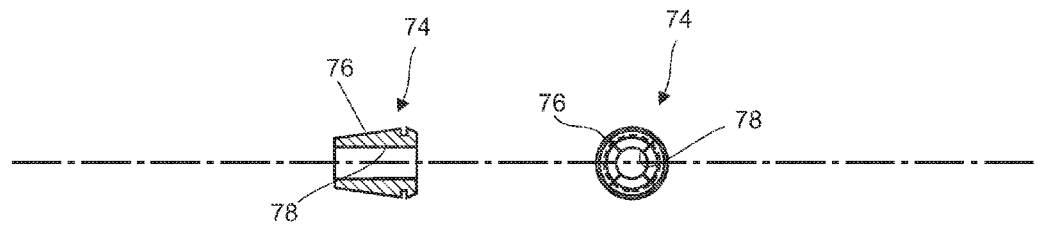
FIG. 7A is a cross section view of a tool clamping sleeve of the invention.
FIG. 7B is an end view of the tool clamping sleeve of FIG. 7A.
Figures 8A, 8B, 8C:
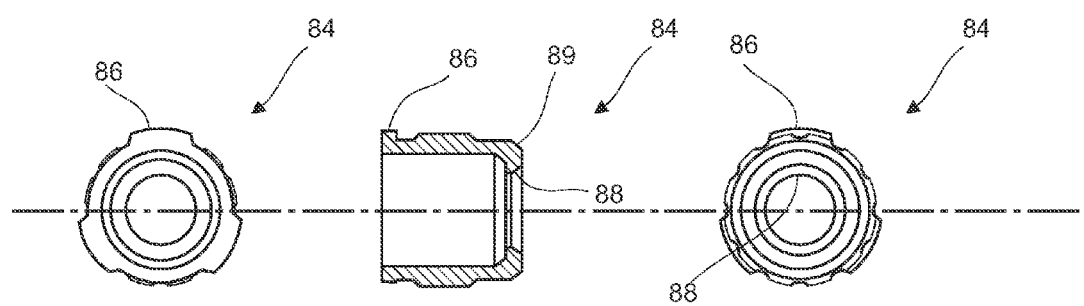
FIG. 8A is a back end view of a collect cap sleeve of the invention.
FIG. 8B is a cross section view of the collect cap sleeve of FIG. 8A.
FIG. 8C is a front end view of the collect cap sleeve of FIG. 8A.
Figures 9A, 9B, 9C:
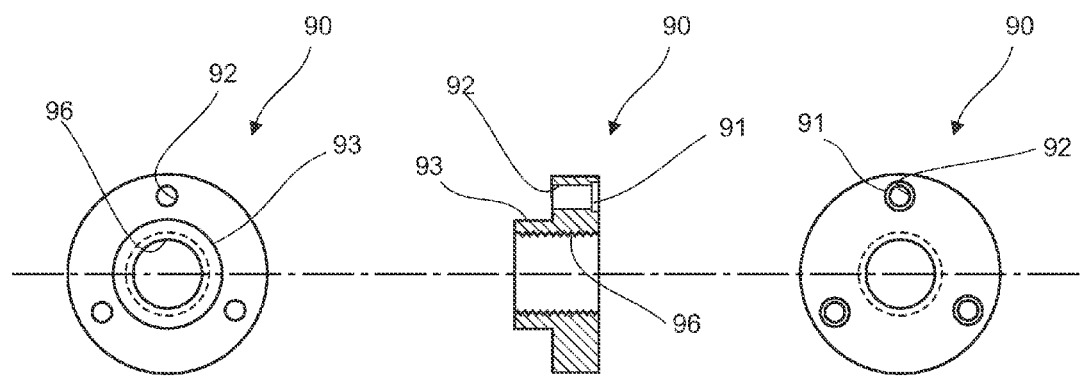
FIG. 9A is a back end view of a drawbar adapter of the invention.
FIG. 9B is a cross section view of the drawbar adapter of FIG. 9A.
FIG. 9C is a front end view of the puller sleeve of FIG. 9A.

As shown in FIG. 4, pulling the drawbar 100 with sufficient force causes the puller sleeve 56 to move towards the spindle 12. This in turn pulls on the collet cap 84 and causes tool clamping sleeve 74 to clamp the tool 82 in position. By so providing, the collet chuck 10 of the instant invention provides for a quick connect collet chuck to a conventional machine spindle which maintains improved concentricity.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A collet chuck configured to connect to a standard milling machine spindle having an inside tapered peripheral surface which terminates adjacent a mounting end of the spindle and a drawbar operably disposed in the spindle, said collet chuck including: a centering sleeve having a tapered outer peripheral surface for contact with the inside peripheral tapered surface of the spindle and has an outer end disposed adjacent the mounting end of the spindle; a chuck body having a base with an outer end; means for mounting said base to the mounting end of the spindle in a manner which prevents axial movement of said chuck body, yet enables axial movement of the drawbar when said base is so mounted, wherein the spindle is characterized to include a plurality of threaded apertures in the spindle mounting end and said mounting means includes a first plurality of apertures formed in said outer end of said base extending therethrough which when said base outer end is disposed adjacent the mounting end of the spindle can be aligned with said plurality of threaded apertures in the spindle mounting end, said mounting means further including a first plurality of screws for threadably connecting said base outer end to the mounting end of the spindle through said apertures when so disposed and means for biasing operably disposed between said outer end of said centering sleeve and a portion of a back side of said base in a manner such that said biasing means exerts a force on said back side prior to a direct connection of said base to the mounting end thereby providing for variances in connection of said base to the mounting end of the spindle and assuring concentricity is maintained when so connected, wherein an outer peripheral portion of said outer end of said centering sleeve contacts an inner surface of said chuck body to provide a contact point for alignment of said chuck body with respect to the spindle.

2. The collet chuck of claim 1, which further includes a neck extending outward from a central region of a front face of said base, said neck having a working end which includes an open inner tapered surface.

3. The collet chuck of claim 2, said base includes a tool clamping sleeve including an outer tapered surface complementary to said inner tapered surface of said working end of said neck and includes an inner surface configured to receive an outer surface of a tool bit, a collet cap sleeve configured to be removably received about said working end of said neck and includes an end configured with means for detentably quick connecting about said neck to the drawbar to retain said tool clamping sleeve in said working end and prevent axial movement thereof.

4. The collet chuck of claim 2, wherein said base includes a plurality of apertures extending therethrough disposed radially outward from said neck, a puller sleeve movably disposed about said neck and includes a plurality of connector legs extending from one end and configured to be slidably received through said plurality of apertures in said base, a tool clamping sleeve including an outer tapered surface complementary to said inner tapered surface of said working end of said neck and includes an inner surface configured to receive an outer surface of a tool bit, a collet cap sleeve configured to be received about said working end of said neck and retain tool clamping sleeve in said working end and includes an end configured to quick detentably connect to said puller sleeve, a drawbar adapter, means for connecting said drawbar adapter to said legs thereby fixably connecting said base therebetween and means for connecting said drawbar adapter to the drawbar.

5. The collet chuck of claim 1, wherein said portion of said back side of said base includes an annular seat formed therein which receives an outer surface portion of said outer end of said centering sleeve adjacent therewith having said biasing means disposed adjacent thereto.

6. A collet chuck configured to connect to a standard milling machine spindle having an inside tapered peripheral surface which terminates adjacent a mounting end of the spindle, wherein the mounting end of the spindle includes a plurality of threaded apertures and a drawbar operably disposed in the spindle:

a centering sleeve having a tapered outer peripheral surface for contact with the inside peripheral tapered surface of the spindle and has an outer end disposed adjacent the mounting end of the spindle;

a chuck body having a base and a neck extending outward from a central region of a front face of said base, an outer end of said base includes a first plurality of apertures extending through said base which when said base outer end is disposed adjacent the mounting end of the spindle can be aligned with the plurality of threaded apertures of the spindle mounting end, said base includes a second plurality of apertures extending therethrough disposed radially outward from said neck and inward from said first plurality of apertures, said neck having a working end which includes an open inner tapered surface;

means for biasing operably disposed between said outer end of said centering sleeve and a portion of a back face of said base;

a first plurality of screws for threadably connecting said base outer end to the mounting end of the spindle through said apertures;

a puller sleeve movably disposed about said neck and includes a plurality of connector legs extending from one end and configured to be slidably received through said second plurality of apertures in said base, wherein each said leg includes a threaded aperture, and an outer end of said puller sleeve includes a retaining collar;

a tool clamping sleeve including an outer tapered surface complementary to said inner tapered surface of said working end of said neck and includes an inner surface configured to receive an outer surface of a tool bit;

a collet cap sleeve configured to be received about said working end of said neck and includes a quick connect end configured to quick connect to said retaining collar of said puller sleeve, an outer end of said collet cap sleeve includes a retaining collar which when said quick connect end is connected to said retaining collar of said puller sleeve, said retaining collar of said collet cap sleeve contacts said tool clamping sleeve in a retaining manner;

a drawbar adapter including a plurality of apertures aligned with said threaded apertures of said legs, said drawbar adapter including a threaded aperture to receive a threaded end of the drawbar of the machine spindle; and a second plurality of screws threadably connecting said drawbar adapter to said puller sleeve legs thereby fixably connecting said base therebetween.

7. The collet chuck of claim 6, wherein said portion of said back face includes an annular seat formed therein which receives a portion of said outer end of said sleeve in contact therewith having said biasing means disposed adjacent thereto.

8. A collet chuck configured to connect to a milling machine spindle having an inside tapered peripheral surface which terminates adjacent a mounting end of the spindle, and a drawbar operably disposed in the spindle, said collet chuck including:

a centering sleeve having a tapered outer peripheral surface for contact with the inside peripheral tapered surface of the spindle and has an outer end disposed adjacent the mounting end of the spindle;

a chuck body having a base with an outer end;

means for mounting said base to the mounting end of the spindle in a manner which prevents axial movement of said chuck body, yet enables axial movement of the drawbar when said base is so mounted;

means for biasing operably disposed between said outer end of said centering sleeve and a portion of a back side of said base in a manner such that said biasing means exerts a force on said back side prior to a direct connection of said base to the mounting end thereby providing for variances in connection of said base to the mounting end of the spindle and assuring concentricity is maintained when so connected, wherein the mounting end of the spindle is characterized to include a plurality of threaded apertures of the spindle mounting end and said mounting means includes a first plurality of apertures formed in said outer end of said base extending therethrough which when said base outer end is disposed adjacent the mounting end of the spindle can be aligned with said plurality of threaded apertures of the spindle mounting end, said mounting means further including a first plurality of screws for threadably connecting said base outer end to the mounting end of the spindle through said apertures when so disposed; and wherein said base includes a second plurality of apertures extending therethrough disposed radially outward from said neck, a puller sleeve movably disposed about said neck and includes a plurality of connector legs extending from one end and configured to be slidably received through said second plurality of apertures in said base, a tool clamping sleeve including an outer tapered surface complementary to said inner tapered surface of said working end of said neck and includes an inner surface configured to receive an outer surface of a tool bit, a collet cap sleeve configured to be received about said working end of said neck and retain said tool clamping sleeve in said working end and includes an end configured to quick detentably connect to said puller sleeve, a drawbar adapter, means for connecting said drawbar adapter to said legs thereby fixably connecting said base therebetween and means for connecting said drawbar adapter to the drawbar.

* * * * *